2 Sheets—Sheet 2.
W. ELLINGER.
Ball-Joint.
No. 206,393. Patented July 30, 1878.
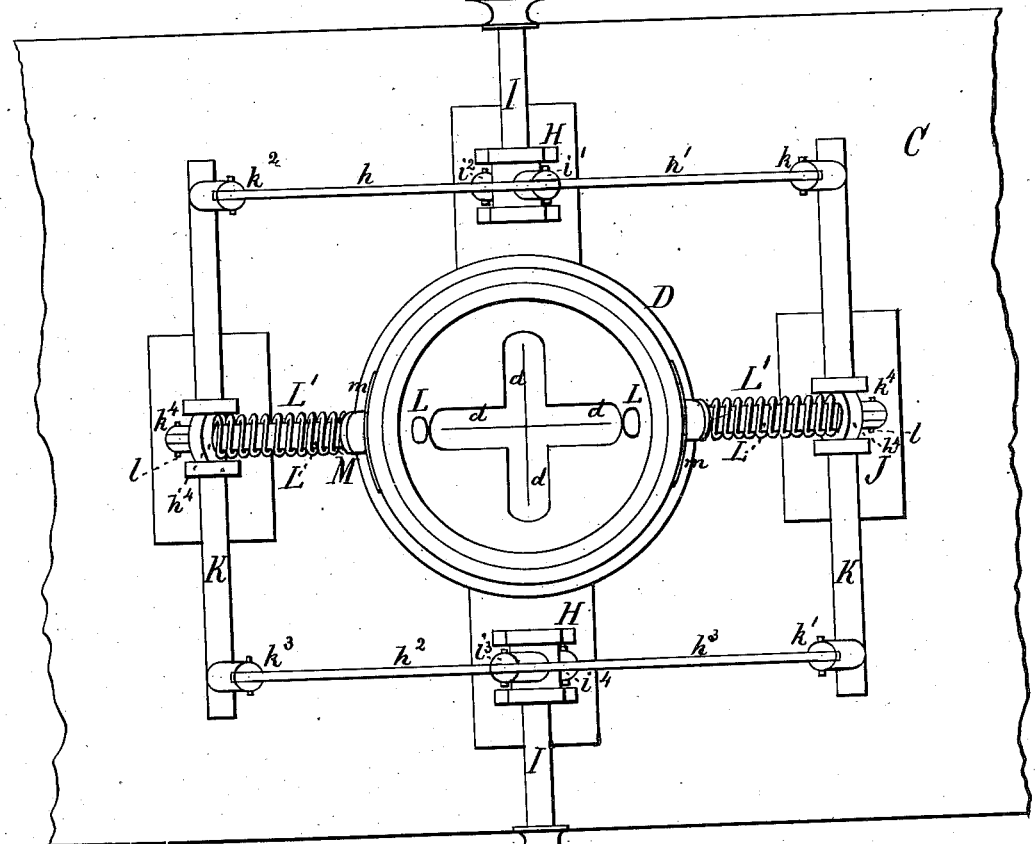
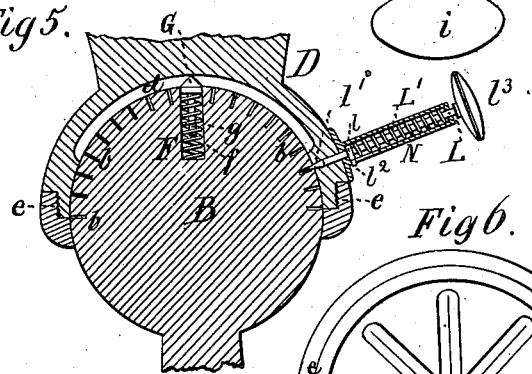
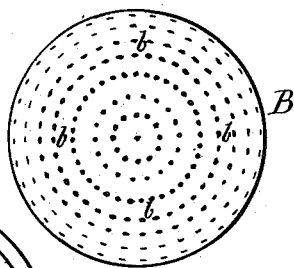
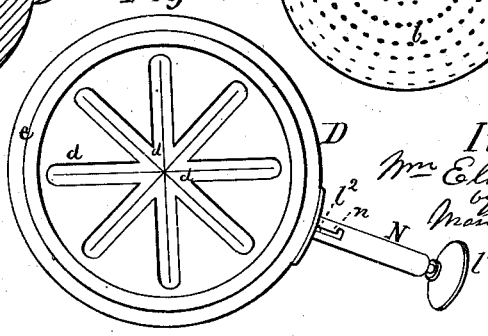
Witnesses:
Inventor:

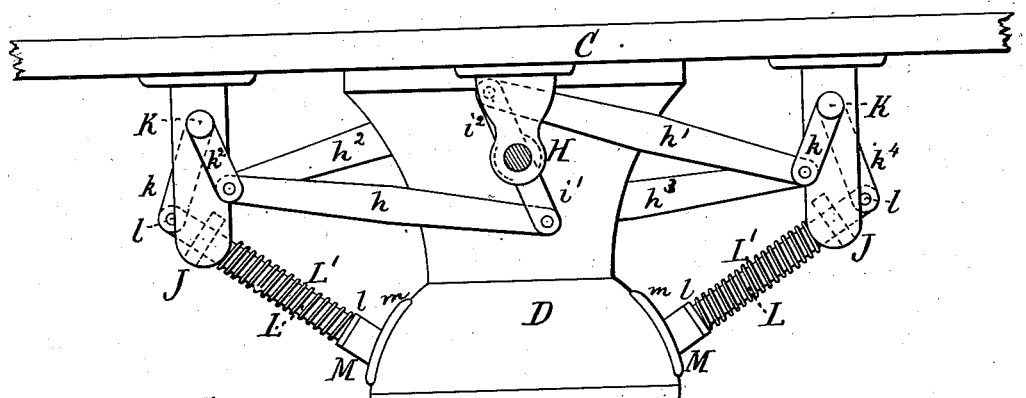
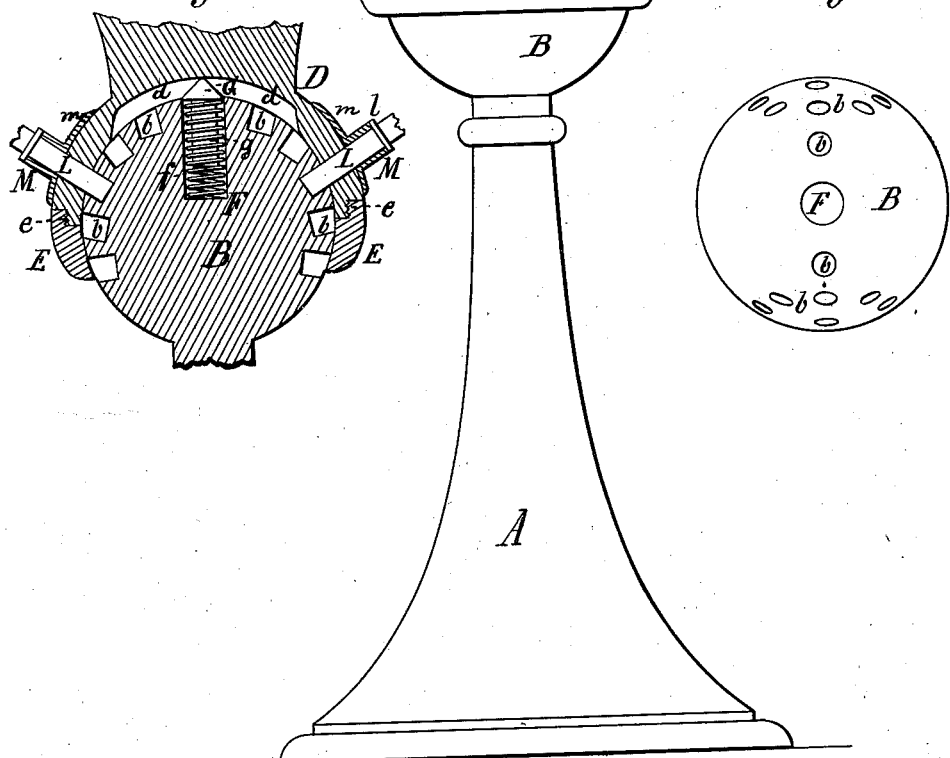
W. ELLINGER.
Ball-Joint.
No. 206,393.    Patented July 30, 1878.
Fig 1.
Fig 2.    Fig 3.
Witnesses:    Inventor:

UNITED STATES PATENT OFFICE.

WILLIAM ELLINGER, OF BALTIMORE, MARYLAND.

IMPROVEMENT IN BALL-JOINTS.

Specification forming part of Letters Patent No. 206,393, dated July 30, 1878; application filed July 3, 1878.

*To all whom it may concern:*

Be it known that I, WILLIAM ELLINGER, of the city and county of Baltimore, in the State of Maryland, have invented a new and useful Improvement in Ball-Joints, which improvement is fully set forth in the following specification and accompanying drawings, in which latter—

Figure 1 is a front elevation of my improved ball-joint, exhibiting the means whereby it may be adjusted in any desired position. Fig. 2 is a vertical central section of the ball-joint proper and a part of its adjusting mechanism. Fig. 3 is a detail view of the ball. Fig. 4 is a bottom view of my improved ball-joint, having the ball removed. Fig. 5 is a section of a modified construction of my ball-joint. Fig. 6 is a top view of its outer bearing, and Fig. 7 is an elevation of the ball thereof.

The nature of my invention consists in certain constructions, combinations, and arrangements of parts, hereinafter fully described and specifically claimed, whereby an adjustable ball-joint is produced, which is capable of being moved in certain directions, and held, by spring-bolts and sockets, in any inclination desired in such direction.

The object of my invention is to make an adjustable connection between a supporting-stand and a platform or other attachments to the socket and ball, whereby the platform or other attachments may be quickly moved to any desired position, and automatically "set" or firmly secured in such position.

My invention furnishes a very convenient joint for shafting and support for tables in all kinds of trade and art, especially for surgical operations, and also for sick-beds in hospitals, as well as for surveying and astronomical instruments.

In the accompanying drawings, A represents a stand of ordinary construction, which is provided at the top with a ball, B. C represents a plain platform, which is provided at the bottom with a hollow semi-spherical bearing, D. The bearing D rests upon the ball B, and is provided with an annular bearing, E, which extends from the largest diameter of the ball some distance down to a smaller diameter, and so prevents the upper bearing, D, from being lifted from the ball. The two bearings D E may be united with a screw-thread, $e$, as shown in Fig. 2.

The bearing D is provided with two V-shaped grooves, $d$, which, by preference, intersect each other at the vertex of the ball when the platform C is in a horizontal position.

At the vertex of the ball B a vertical hole, F, is provided, which contains a spring, $f$, and a conical head, G, with a central shank, $g$.

The shank $g$ is inserted into the spring $f$, and the head G is pressed by the said spring into the groove $d$, thus furnishing a guide for the spherical bearing, which will not become loose by wear, as would be the case with rigid guides.

The number of the grooves is not limited, and I have shown in Fig. 6 how four such grooves may be arranged; and, if required, there may be also a circular groove, whereby all the meridional grooves may be united at a suitable elevation. One or more of the said grooves may be spiral instead of meridional, in order to suit certain requirements as to the position of the platform.

To the bottom of the platform C two slotted stands, H, are fastened in a central position to the bearing D. The stands H support two short shafts, I, with knobs $i$ and double-lever arms $i^1$ $i^2$ $i^3$ $i^4$.

The bottom side of the platform C is provided with two other slotted stands, J, which support two shafts, K, parallel to the shafts I. The shafts K are provided with arms $k$ $k^1$ $k^2$ $k^3$, which are connected with the arms $i^1$ $i^2$ by means of connecting-rods $h$ $h^1$ $h^2$ $h^3$.

The rod $h$ connects the arms $i^1$ $k^2$, the rod $h^1$ the arms $i^2$ $k$, the rod $h^2$ the arms $i^4$ $k^3$, and the rod $h^3$ the arms $i^3$ $k^1$, by which arrangement the knobs $i$ can each be turned to the right in the act of their operation.

In the slotted stands J the shafts K are provided with arms $k^4$, to each of which a bolt, L, is attached by means of a pin, $l$. The bolt L is passed through a plate, $h^4$, in the stand J and through a tubular guide, M, fastened by means of a flange, $m$, to the bearing D. A spring, L′, is secured upon the bolt L between a collar, $z$, of the same and the plate $h^4$, whereby the end of the bolt is kept in a suitable socket hole, $b$, in the ball B. There are shown in Figs. 2 and 3 as many socket-holes $b$ as are desired for ordinary use, where a moderate number of inclinations of the platform C is sufficient, and when a considerable degree of strength of the ordinary parts is necessary.

When less strength of the bolts and a greater number of adjustments are the objects desired by the operator, I propose a great number of small socket-holes, $b$, as shown in Figs. 5 and 7, which may be arranged either in zoned, meridional, or spiral directions, and one or two smaller spring-bolts, L, with pointed ends $l^1$, whereby the entrance of the bolts into the socket-holes is facilitated, and whereby a liability of the bolts to wear loose in the sockets and imperfect adjustment are avoided. I have shown in Fig. 5 a modified construction of the spring-bolt L, which will answer the purpose well when only one bolt is used to steady the ball-joint. In such case the connections I K $h$ $h^1$ $h^2$ $h^3$ may be omitted and the spring L inclosed in a tube, N, provided with a bayonet-groove, $n$, in which a pin, $l^2$, of the bolt L moves. The operator may then, by means of a knob, $l^3$, at the outer end of the bolt, pull the same out of the socket-hole $b$, and by a slight turn move the pin $n$ into the retaining transverse part of the groove $n$, Fig. 6, and leave it there until he has made the proper changes in his adjustments.

Operation: Supposing the platform to be in a horizontal position, and that a change to a certain inclination is desired, the operator will place himself in front of one of the knobs $i$ and turn the same to the right, thereby withdrawing the bolts L from their sockets $b$. He now changes the position of the platform to suit his purpose, and then relinquishes his hold upon the knob $i$, whereupon the bolts L, by the action of the springs L', are automatically pushed into corresponding sockets $b$, thereby securing the platform in its new position. If the operator makes use of an assistant, he has him stationed at the side of the platform opposite him, and both turn one of the knobs $i$ to the right to withdraw the bolts L from their sockets. It will thus be seen that by my construction if either one or both of the knobs are turned to the right such act will withdraw the bolts.

Instead of having the bearing D E made as described, it may be vertically divided into two parts without changing the principle of my invention; and for universality of adjustment with the plans shown in Figs. 5, 6, and 7 the grooves $d$ might be dispensed with, as well as guide G.

What I claim as new and of my invention is—

1. In combination with a ball-and-socket joint, a guide, G, and a groove or grooves, $d$, and a locking bolt or pin, substantially as and for the purpose described.

2. A guiding groove or grooves, $d$, for a stop locking-pin, provided in the socket of a ball-joint, substantially as and for the purpose described.

3. A guide, G, for a stop locking-pin, provided on the ball of a ball-and-socket joint, substantially as and for the purpose described.

4. Stop-holes $b$, provided in the ball of a ball-and-socket joint, in combination with an entering stop locking-pin, substantially as and for the purpose described.

5. The combination of a ball, a socket, groove or grooves $d$, guide G, stop-holes $b$, and a locking bolt or pin, substantially as and for the purpose described.

6. In combination with a ball-and-socket joint, provided with mechanism for sustaining a platform or other superincumbent structure, spring-bolts and a lever mechanism, whereby two spring-bolts may be operated by turning a single knob on either side of the platform, substantially as and for the purpose described.

WM. ELLINGER.

Witnesses:
S. A. MORSE,
GEO. MCCAFFRAY.